United States Patent
Crabeil et al.

(10) Patent No.: US 10,435,976 B2
(45) Date of Patent: Oct. 8, 2019

(54) ELECTROCHEMICAL WELL PIPE CUTTING INSTRUMENT

(71) Applicant: FLODIM, SARL, Manosque (FR)

(72) Inventors: Jean-Paul Crabeil, Manosque (FR); Thierry Walrave, Manosque (FR); Jérémy Fremont, Manosque (FR); Michel Bittner, Manosque (FR); Monica Ballus, Manosque (FR)

(73) Assignee: FLODIM, SARL, Manosque (FR)

( * ) Notice: Subject to any disclaimer, the term of this patent is extended or adjusted under 35 U.S.C. 154(b) by 6 days.

(21) Appl. No.: 15/509,940

(22) PCT Filed: Aug. 7, 2015

(86) PCT No.: PCT/IB2015/056014
§ 371 (c)(1),
(2) Date: Mar. 9, 2017

(87) PCT Pub. No.: WO2016/038482
PCT Pub. Date: Mar. 17, 2016

(65) Prior Publication Data
US 2017/0260826 A1      Sep. 14, 2017

(30) Foreign Application Priority Data
Sep. 9, 2014 (EP) .................................. 14382335

(51) Int. Cl.
*E21B 29/00* (2006.01)
*E21B 29/02* (2006.01)
(Continued)

(52) U.S. Cl.
CPC .............. *E21B 29/02* (2013.01); *B23H 3/04* (2013.01); *B23H 7/28* (2013.01); *B23H 9/00* (2013.01);
(Continued)

(58) Field of Classification Search
CPC ...................................................... E21B 29/02
(Continued)

(56) References Cited

U.S. PATENT DOCUMENTS

| 4,144,936 A | 3/1979 | Evans |
|---|---|---|
| 5,435,394 A | 7/1995 | Robertson |

(Continued)

FOREIGN PATENT DOCUMENTS

| DE | 21 21 111 A1 | 11/1972 |
|---|---|---|
| UA | 27 525 U | 11/2007 |
| WO | WO 02/25050 A2 | 3/2002 |

OTHER PUBLICATIONS

International Search Report as issued in International Patent Application No. PCT/IB2015/056014, dated Mar. 1, 2016.

*Primary Examiner* — Taras P Bemko
(74) *Attorney, Agent, or Firm* — Pillsbury Winthrop Shaw Pittman LLP

(57) ABSTRACT

An electrochemical well pipe cutting instrument, applicable in particular for cutting any type of pipes accessing underground works with conductive fluid inside, includes at least one device for ensuring electrical continuity and at least one electrode. The instrument also includes at least one device for ensuring mechanical fixation of the instrument in the pipe such as an anchor. The device for ensuring electrical continuity, the anchor and electrode can be adjusted in length to suit different diameters of pipe within a large range. Optionally the electrodes are located on a rotary device. The instrument is connected to a main instrument body which includes an electronic module, at least one centralizer and a CCL module with an inclinometer. The main instrument body is connected to a cable head which ensures the communication to a surface unit.

7 Claims, 5 Drawing Sheets

(51) Int. Cl.
- *B23H 3/04* (2006.01)
- *B23H 7/28* (2006.01)
- *B23H 9/00* (2006.01)
- *E21B 17/10* (2006.01)
- *E21B 47/024* (2006.01)
- *E21B 47/09* (2012.01)

(52) U.S. Cl.
CPC ............ *E21B 17/10* (2013.01); *E21B 47/024* (2013.01); *E21B 47/09* (2013.01); *B23H 2400/10* (2013.01)

(58) Field of Classification Search
USPC .......................................................... 166/55
See application file for complete search history.

(56) References Cited

U.S. PATENT DOCUMENTS 6,173,773 B1 * 1/2001 Almaguer ............. E21B 43/119
166/241.1
2010/0326659 A1 12/2010 Schultz et al.

* cited by examiner

ELECTROCHEMICAL WELL PIPE CUTTING INSTRUMENT

CROSS-REFERENCE TO RELATED APPLICATIONS

This application is the U.S. National Stage of PCT/IB2015/056014, filed Aug. 7, 2015, which in turn claims priority to European patent application number 14382335.9 filed Sep. 9, 2014. The content of these applications are incorporated herein by reference in their entireties.

OBJECT OF THE INVENTION

The invention, as described in the heading of these specifications, is a well pipe cutting instrument, presenting a number of advantages and innovative characteristics that are described in more detail below and that together give an improved alternative to other systems currently known in the state of the art.

The object of the present invention is specifically an instrument for use in underground works for cutting well pipes, which is innovatively based on an electrochemical system comprising, as a minimum, an anchor or centralizer and an electrode designed especially to initiate and produce a cut in the pipe in which it is inserted.

The electrochemical well pipe cutting instrument being designed for connection to a main instrument body including, among other devices, an electronic module and means of connection to a communication and self-supporting cable which is connected to a surface unit. The cable is operated from a winch in order to move the instrument through the pipes.

FIELD OF APPLICATION OF THE INVENTION

The field of application of the present invention is within the underground services sectors, specifically in the field of systems, equipment and devices for cutting well pipes, as an example well accessing to solution mined cavities and by extension any type of underground works.

BACKGROUND OF THE INVENTION

As is known, the development of solution mined cavities requires to have casing shoes in such a position to optimise shape and size.

Due to vibrations, falling rocks or undesirable downhole conditions, the pipes may bend, fracture or collapse. In such cases, optimised development of the reservoir is no longer guaranteed, necessitating the cutting of pipes.

A number of methods for achieving said cutting have been developed and proven. The operation is generally chosen based on price, availability, safety and environmental considerations, including size, depth, surface conditions of the pipes and the cleanliness of the cut.

The main existing methods are:
- Explosive charges, chemical or plasma products, which are hazardous to store, transport and work with,
- Mechanical blades perform cuts from electric cable or coiled tubing units but have limitations with regard to pipe size,
- Abrasive methods used by work-over rigs that perform cuts using a mechanical cutting tool at the end of the pipe string within the casing to be cut.

All of these methods have their own limitations, advantages and disadvantages, including success rate, operating time while the underground system is on stand-by and the possibility to subsequently run logging instruments.

There follows a brief description of the operation, advantages and disadvantages of the best known cutting methods:
Explosive Methods—Segmented Cutter
Based on detonating a charge with a particular shape and producing a metal flow that penetrates the target. The most widely cutter on electric lines. Suitable for large diameter pipes. Must be centred to achieve a complete cut.
Advantages: reliable, light, quick to mobilise and use.
Disadvantages: the cut is not clean, logging operation cannot be performed safely after the cut, damages to the outer pipe
Explosive Methods—Split Shot
Based on detonating a charge in a vertical configuration with an electric line. Used at the collar level. Produces a vertical cut.
Advantages: reliable, light, quick to mobilise and fast to operate. Can be run through small size pipes, able to cut larger size casings if run through restrictions.
Disadvantages: the cut is not clean, logging operation cannot be performed safely after the cut, damages to outer pipe.
Abrasive—Abrasive Cutter
Based on a rotating tool with nozzles on a coiled tubing in order to cut a pipe with a mixture of water, brine, oil and sand.
Advantages: clean cut, safe running of wireline operations.
Disadvantages: high price, time for mobilisation and deployment, difficult control of the cut, success rate, damages to outer pipe.
Rotating Blades
Based on a rotating blade powered by an electric motor. Maximum diameter of 5½" (larger sizes in development).
Advantages: clean cut, reliable, no dangerous product handling, logging operation can be performed safely after the cut.
Disadvantages: expensive logging instrument, not available for diameters above 6⅝".
Chemical Cutter
Based on the use of Bromine trifluoride (BrF3) forced through an oil/steel mixture. The BrF3 reacts with oil and ignite the steel wool. Requires clean pipe, centralizing, anchoring, differential pressure.
Advantages: clean cut, logging operation can be performed safely after the cut.
Disadvantages: BrF3 is dangerous, incomplete cuts happen often, damages to outer pipe.
Radial Cutting Torch
Based on an exothermic reaction. Produces a blast that causes a stream of molten plasma.
Advantages: not explosive, quick to mobilize, fast, no chemical hazards, clean cut, logging operation can be performed safely after the cut, works with stainless chrome, cuts in all liquids and in dry pipes.
Disadvantages: not available for diameters above 8⅝", expensive, damages to outer pipe.

The U.S. Pat. No. 4,144,936 document describes a down hole milling or grinding system which comprises a hydraulic motor suspended in the hole driven by sea water to rotate an electrical generator and to rotate a cutting tool. The tool comprises radially movable; electrically conductive elements which form the cathodes of an electrochemical machining operation for removing metal and contact elements which form the anodes. The rotation of the cutting tool causes the movement outwardly from the rest position to the contact position of the electrically conductive elements and the contact elements.

In view of all of the above, the objective of the present invention is to offer an alternative method to those already known, based on an electrochemical cutting tool with the advantages of providing a very clean cut, with no dangerous products and able to cut any pipe or casing within a wide range of diameters.

Nevertheless, in reference to the current state of the art, it should be noted that, while many known types of equipment, mechanisms and devices exist for cutting pipes of the type in question, none have the particular technical, structural or constituent characteristics presented by the tool described herein, the distinguishing characteristics of which are described in the final claims accompanying these specifications.

Explanation of the Invention

Specifically, what the invention offers is an instrument that is applicable in particular to well pipe cutting, innovatively based on a mechanised electrochemical system comprising, at least one mean for ensuring electrical continuity and at least one electrode arranged in such a way they are capable of producing a cut in the pipe in which the tool is inserted. Generally well pipes are made of metal, especially of steel.

Optionally, the instrument comprises also at least one mean for ensuring mechanical fixation of the instrument in the pipe which ensures proper positioning of the instrument inside the pipe to cut and keep the instrument at the right depth. Preferably the mean for ensuring mechanical fixation of the instrument in the pipe is also a mean for ensuring electrical continuity.

The electrochemical well pipe cutting instrument optionally incorporates several features to optimize its operations such as an electronic module to ensure communication to the surface and to deliver an adapted power supply to the electrode or electrodes or additional sensors like CCL (Casing Collar Locator) or Inclinometer.

This instrument is preferably connected to a self-supporting electric cable or coiled tubing that ensures communication and power supply. This cable or coiled cable is run from a winch in order to move up or down to the required depth of the cut.

Furthermore, the new well pipe cutting tool complies with the strict specifications required to meet market expectations:

Small outer diameter to enter standard Pressure Control Equipment,
easy power supply from the surface to the downhole tool
Ability to be anchored in any type of casing within a large range of diameters
System that holds the electrode(s) is able to adapt to any pipe size,
Shape of the groove improved by optimized electrochemical circuit,
Integration of additional sensors to correlate depth (CCL, . . . ) and cutting downhole condition (inclinometer, . . . )
Downhole weak points in case instrument is stuck.

As is known, electrochemical machining systems involve the connection of the work-piece to the positive electrode (anode) of a current generator and the cutting tool to the negative electrode (cathode), both being immersed in a conducting solution or electrolyte.

For the instrument offered by the present invention, the work-piece is the casing or the pipe to be cut and the cutting tool is made of the electrode(s), and the electrolyte is primarily brine, although in some cases this is not necessary.

The electrochemical reaction is initiated at the anode and sustained throughout the cutting process. In the reaction, the metal passes from a solid state to a solution and forms hydroxides that may reduce conductivity, but since the reaction is exothermic, natural renewal of the electrolyte is ensured.

It should be noted that the quantity of material that can be eliminated is directly proportional to the energy entered into the system, i.e. the power delivered to the electrodes, multiplied by the time.

The instrument's operation is therefore based on the following:

Under the high current applied to the electrodes, two main reactions take place:

At the anode, $Fe \rightarrow Fe^{+++} 2e-$
At the cathode, $2 H_2O + 2e- \rightarrow H_2 + 2 OH-$ The overall result of $Fe^{+++} 2 OH- \rightarrow Fe(OH)_2$ shows that black particles of ferrous oxide settle down quite fast if not agitated.

Thus, if reaction is duly controlled by adjusting the anode-cathode distance, if electrode shape is optimized, if electrolyte circulation is ensured, then metal is dig out all along a circular groove with a limited width in order to have all of the work to deepen the groove until it gets through and the pipe drops.

In industrial facilities, clean and fresh electrolyte is permanently pumped in order to maintain an optimized conductivity between cathode and anode. In our case, this is not possible but most of the ferrous oxide is pushed away, thanks to the combination of an adapted fluid renewal system and of a natural upward/downward flow due to thermal convection.

Faraday's laws of electrolysis state that the mass of a substance altered during electrolysis is directly proportional to the quantity of electricity transferred. This can be summarised as:

$$m = \left(\frac{Q}{F}\right)\left(\frac{M}{z}\right)$$

m is the mass of the substance liberated at an electrode in grams
Q is the total quantity of current passed through the substance (thus, Q=I*t)
$F=96485$ $C \cdot mol^{-1}$ is the Faraday constant
M is the molar mass of the substance
z is the valence number of ions of the substance (electrons transferred per ion).

Adapted to our case, a mean width of 5 mm in a 7" casing with an outer diameter of 180 mm and thickness of 8 mm will require the removal of 21,600 mm3 of iron or 188 grams (O.D.=180 mm, I.D.=164 mm, M of iron=56 grams/mole, Z=2).

Q is the quantity of current required to cut the pipe. This can be calculated at 647,800 Coulombs, equivalent to around four and a half hours if the intensity is 40 amps.

In real conditions, better results can be obtained, proving an excellent level of performance, even where the concentration of the brine is below that sea water. Thus, all calculations are a function of the diameter and of the thickness of the pipe to be cut.

There follows a brief description of advantages and drawbacks of the electrochemical well pipe cutter:

Advantages: reliable, light, quick to mobilise, no dangerous products, clean cut, no damage to the external pipe, logging operation can be performed safely after the cut, large range of diameter possible to be cut.

Disadvantages: time of cut for large diameter, conductive fluid needed.

The described electrochemical well pipe cutting instrument therefore consists of an innovative structure with hitherto unknown characteristics for the intended purpose, reasons which together with its practical utility give it sufficient grounds to obtain the requested exclusivity privileges.

DESCRIPTION OF THE DRAWINGS

To supplement the description in this document and in order to aid comprehension of the characteristics of the invention these specifications include as an accompaniment a set of illustrative, non-restrictive plans representing the following.

PREFERRED EMBODIMENT OF THE INVENTION

The aforementioned figures together with the numbering used show an example of a preferred, but non-restrictive, embodiment of the above named electrochemical well pipe cutting instrument, comprising the parts and elements indicated and described in detail below.

Figure 1:
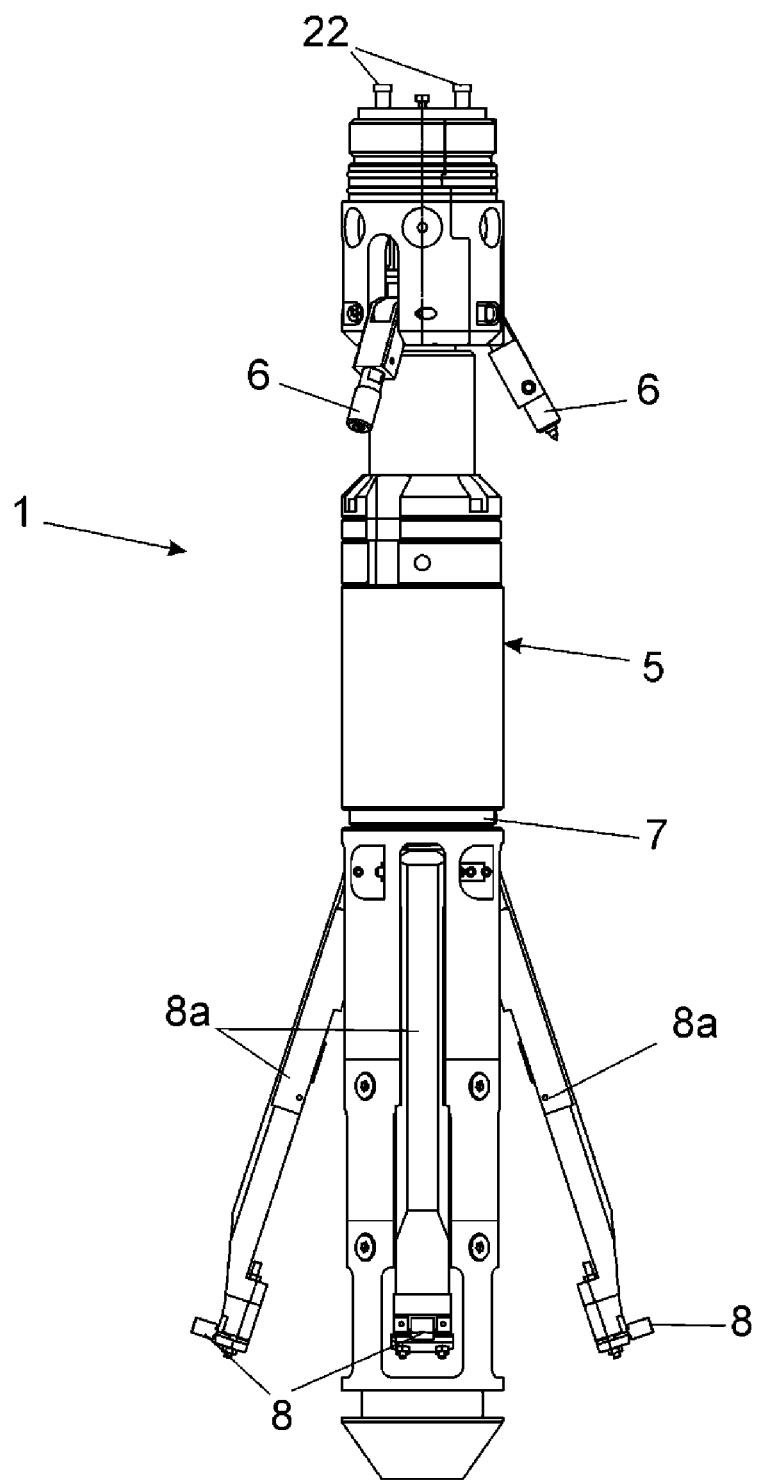
FIG. 1—Shows a vertical schematic view of an example of the well pipe cutting instrument comprising the invention, showing the principal parts and elements comprising the same.

Thus, as can be seen in FIG. 1, the instrument (1) in question, used for cutting pipes (2) in a well (3) accessing underground works (4), preferably with brine, comprises at least one mean for ensuring electrical continuity, such as arms, wires, anchors, fingers or packers, and at least one electrode (8).

Optionally the instrument (1) comprises at least one mean for ensuring mechanical fixation in the pipe such as centralizers, packers or extendable arms.

In a preferred embodiment the mean for ensuring electrical continuity is also the mean ensure mechanical fixation, especially an anchor (6).

In a preferred embodiment, there are more than one anchor (6) located, articulated and arranged radially at the same level. They open to reach the inner wall of the pipe (2), fixing the tool and adjusting to the right inner diameter.

In a preferred embodiment, the electrode or electrodes (8) are arranged radially on a rotary device (7), such that when rotating they are kept at a short distance from the pipe (2) wall, in order to adapt their position to the increasing diameter of said pipe (2), for which reason they are mounted on the end of dedicated arms (8a), so the electrolyte renewal is ensured at the same time by the rotating system.

By preference, the anchors (6) and the electrodes (8) are adjustable in length and are therefore suitable for any type of pipe within an extended range.

Figure 2:
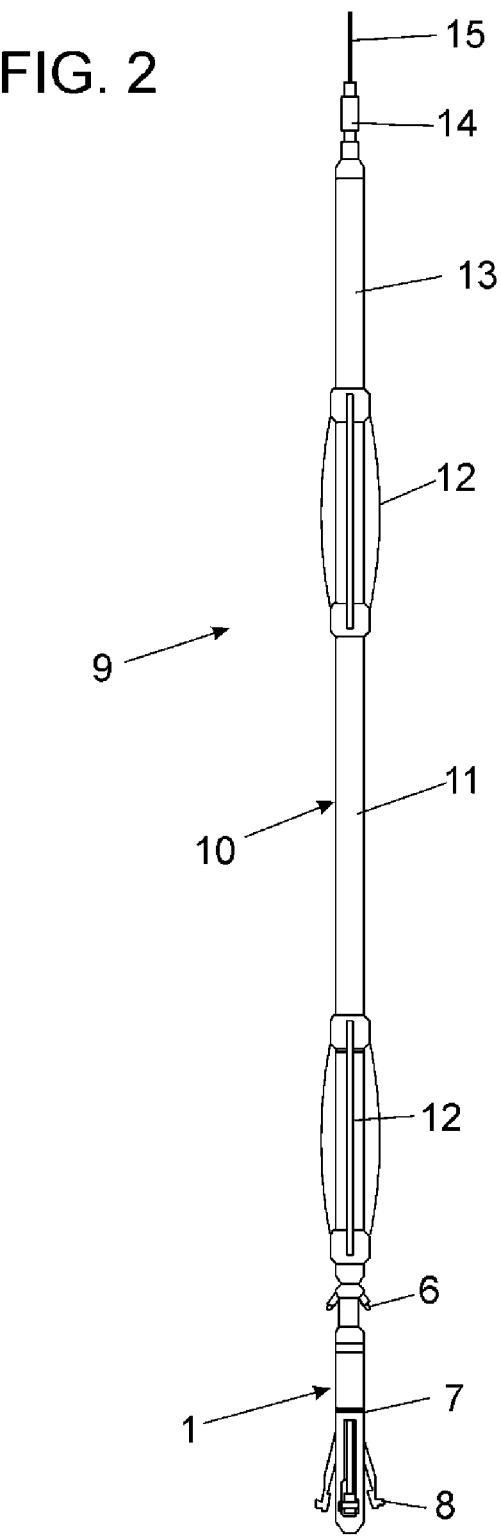
FIG. 2—Shows an overall vertical view of the instrument connected to the cable, showing its arrangement and the devices involved in its operation, handling and control.

From FIG. 2, it can be seen that the instrument (1) is designed for connection to the lower end of the main instrument body (10) that includes as a minimum, an electronic module (11) to deliver an adapted power supply to the electrodes (8) as required. In order to achieve said connection, the body (5) of the cutting part (1) is equipped with connectors (22) for this purpose at its upper end.

In addition, said main instrument body (10) also carries at least one centralizer (12), preferably two, and a CCL module (13) with an inclinometer to both correctly locate the instrument (1) and inform about deviation of the pipe (2).

The main instrument body (10) has at its upper end a connector for connection to a cable head (15) by means of which it is held by the cable which ensures the communication to a surface unit (16).

Figure 3:
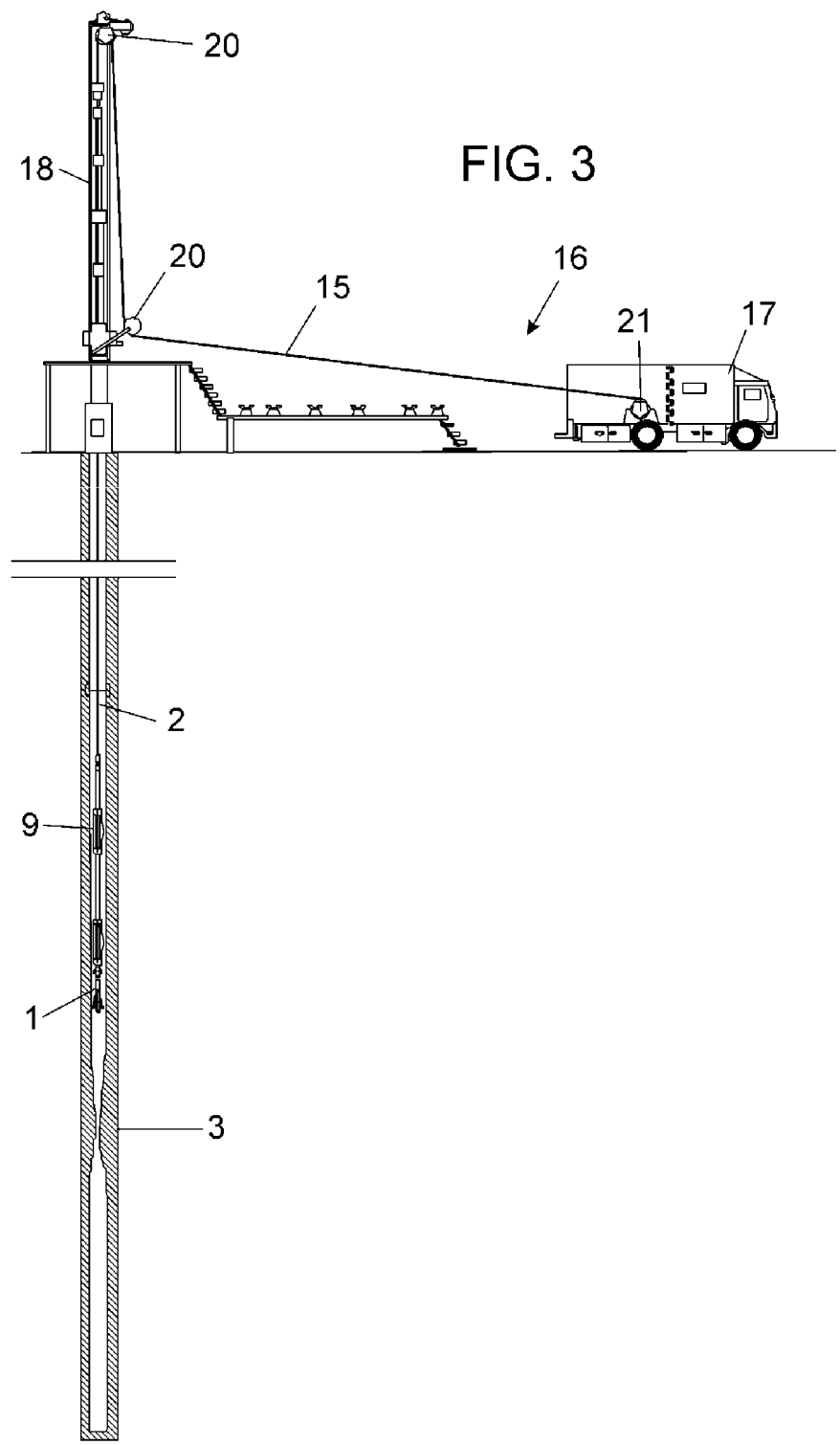
FIG. 3—Shows a vertical sectional view of the instrument in a well, connected to a surface unit by means of a self-supporting electric cable, that ensures communication and power supply, showing the arrangement of all surface equipment.
Figure 4:
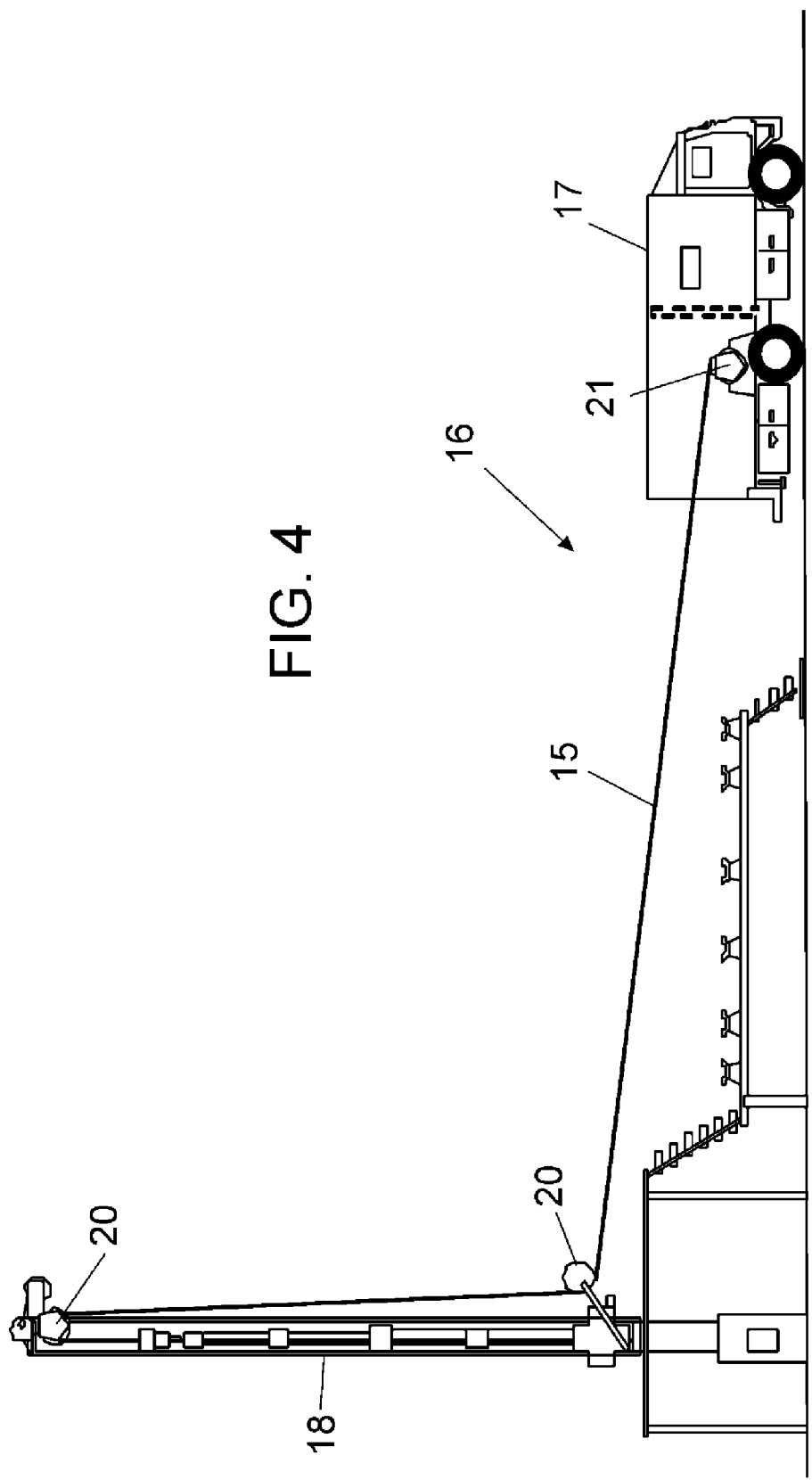
FIG. 4—Shows an enlarged and more detailed view of the previous section shown in FIG. 3, presenting work over rig, cable and surface unit used in said example FIG. 5—Shows a further vertical sectional view of the cutting instrument inserted into the well and connected to another example of a surface unit. In this case with the crane being incorporated in the vehicle and without the cable passing through a lifting tower, it shows the underground cavity where the pipe to be cut is located.
Figure 5:
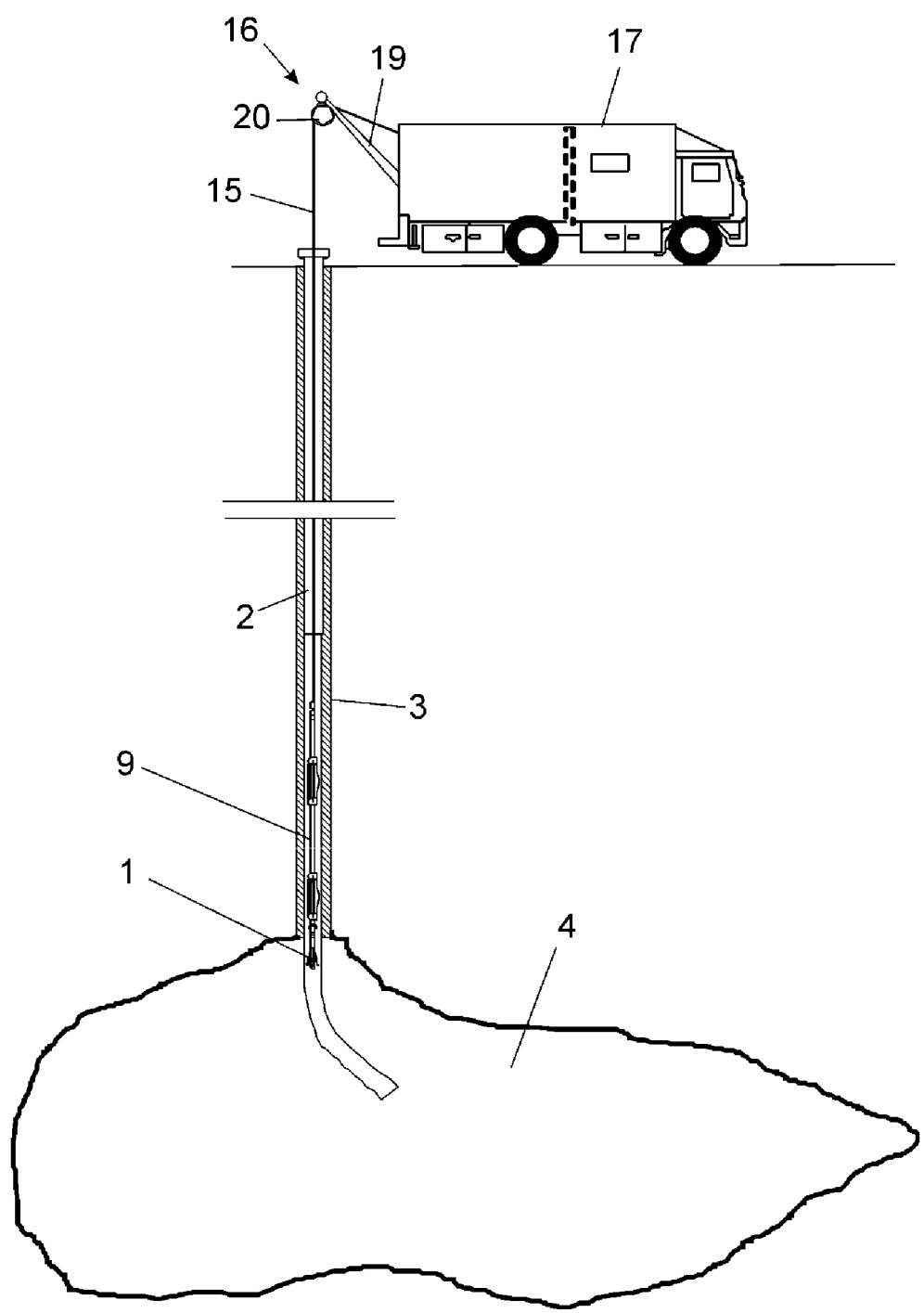

The surface unit (16), as shown in FIGS. 3 to 5, is mobile and comprises a transport vehicle (17) to which the opposite end of the cable (15) is connected, to ensure power supply and communication. It is conveniently equipped with acquisition systems and a laptop to remotely control the instrument (9). The said cable (15) is used to run in (RIH) or to pull out (POOH) the instrument (9) and therefore to determine the level of the cut in the well with an accurate depth measuring device. The surface layout may either be a work over unit, an independent crane or a dedicated crane fitted on the vehicle (17) (FIG. 5). The pulleys (20) ensure correct guiding of the cable from the winch.

The following procedure aims at describing a standard field sequence of events for the well pipe cutting instrument:

On-site installation of a logging unit, for example 7/32" cable, up to 4500 m of standard cable, either surface pressure equipment or not depending on well conditions.

Surface preparation of the instrument (9), connection of upper CCL inclinometer module (13), fast inspection test, rotation validation (7), electrodes opening and closing (8), anchors opening and closing (6), test on a jig at the same diameter of the pipe to cut.

Electrical testing, cable (15) and cutting part (1) continuity tests, communication tests between surface unit (16) and downhole instrument (9).

Rig up of all surface equipment above the Well-Head (3) if no pressure equipment is used. Otherwise run adapted the IWCF (International Well Control Forum) procedure. Lift up instrument (9) with winch (21) above the well-head (3).

Zero depth on surface; start to run in hole (RIH) with instrument (9); Go down to the required depth.

Check well conditions are good, looking at the tension, CCL and inclinometer (13) values.

Pull Out Of Hole (POOH) and record a log (Tension/DSCL/Incl.) versus depth. Identify the best possible depth to cut. Go to the depth while POOH.

Open anchors (6), and set instrument depth at the right position, and give some slack to the cable in order to ensure anchoring.

Open the arms (8a) that hold electrodes (8) and start rotation (7).

Step by step increase the current delivered to the electrodes (8) up to the maximum admissible level of intensity.

Real time follow-up on screen of the main downhole instrument parameters (Intensity per electrode, Voltage, Power, Electronic module internal Temperature, Rotary engine power).

Detection of the first piercing

Keep on with the operation until detection of the end of the cut

Stop the rotary device (7). Close arms (8a) that hold the electrodes (8). Check with CCL sensor that cut is complete. Pull out of hole (POOH) the instrument up to the surface.

Potentially run additional surveys instruments like sonar or any relevant logging tool Rig-down equipment. Depart from site.

The nature of the present invention having been sufficiently described, as well as the means of its use, a more extensive explanation is not considered to be necessary in order that any expert on the subject might understand its scope and the advantages it offers. It should nevertheless be noted that its essential design may be put to use in other ways that differ in detail from that indicated in the example and that will also fall within the scope of the protection sought provided that the fundamental principle of the invention is not altered, changed or modified.

The invention claimed is:

1. An electrochemical well pipe cutting instrument, applicable in particular for cutting any type of metal pipes accessing underground works with conductive fluid inside comprising at least one means for ensuring electrical continuity;

at least one electrode; and at least one means for ensuring mechanical fixation of the instrument in the pipe, wherein the means for ensuring electrical continuity is also the means for ensuring mechanical fixation, said means for ensuring electrical continuity, which is also the means for ensuring mechanical fixation, is constituted by a plurality of anchors articulated and arranged radially at the same axial level along a longitudinal axis of the electrochemical well pipe cutting instrument, the anchors being adapted to open to directly contact the inner wall of the pipe for fixing the instrument in the pipe.

2. An electrochemical well pipe cutting instrument according to claim 1, wherein the anchors and the electrode are adjustable in length to suit different diameters of pipe within a large range.

3. An electrochemical well pipe cutting instrument according to claim 1, wherein the electrode is located on a rotary device.

4. An electrochemical well pipe cutting instrument according to claim 1, wherein the instrument is connected to a main instrument body which comprises an electronic module to deliver an adapted power supply to the electrode as required.

5. An electrochemical well pipe cutting instrument according to claim 4, wherein the main instrument body also comprises at least one centralizer.

6. An electrochemical well pipe cutting instrument according to claim 5, wherein the main instrument body also comprises a CCL (Casing Collar Locator) module with an inclinometer.

7. An electrochemical well pipe cutting instrument according to claim 4 wherein the main instrument body is connected to a cable head which ensures the communication to a surface unit.

* * * * *